Figure 1:
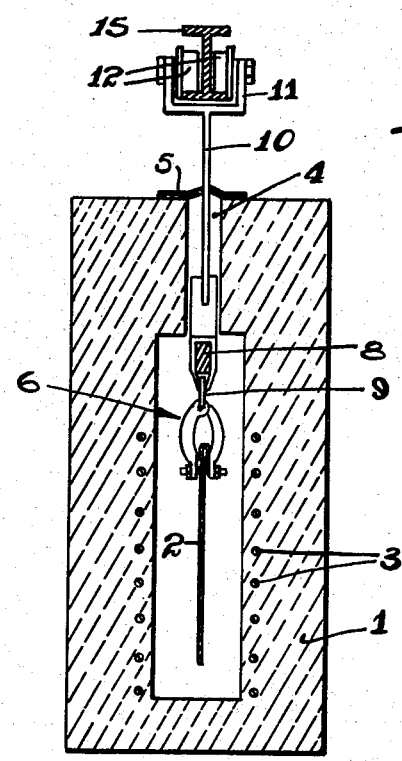

Aug. 27, 1940.   W. OWEN   2,213,014
MAGNETIC CLAMP
Filed Oct. 27, 1938   2 Sheets-Sheet 1

INVENTOR.
WILLIAM OWEN
BY Bradley & Bee
ATTORNEYS.

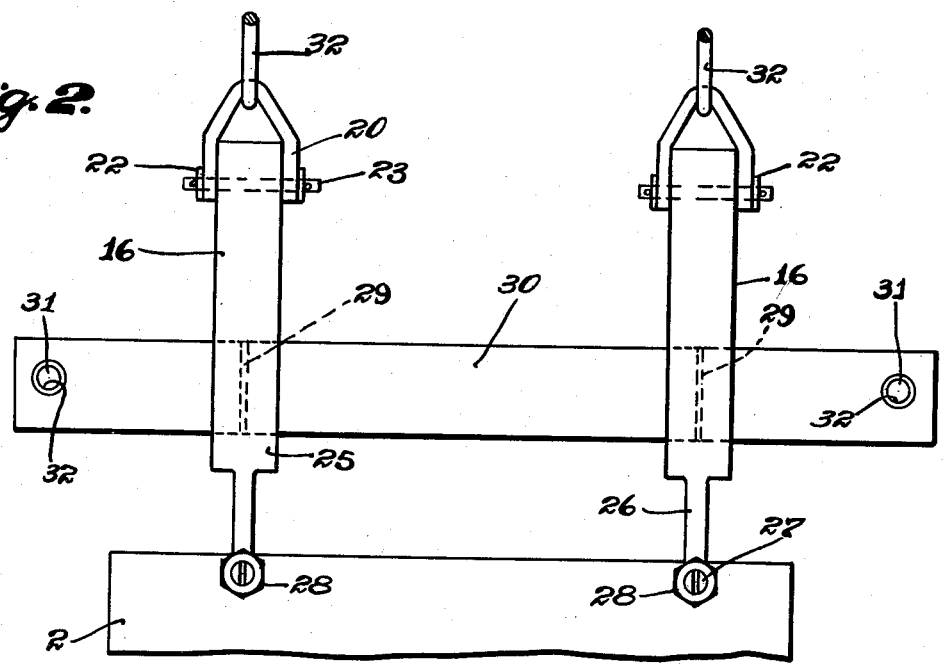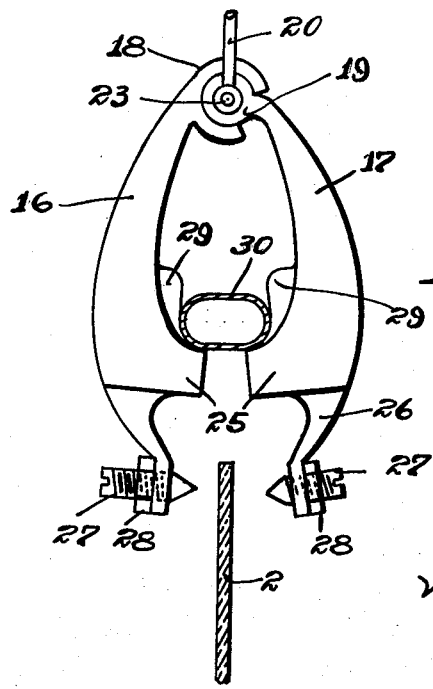

Patented Aug. 27, 1940

2,213,014

UNITED STATES PATENT OFFICE 2,213,014

MAGNETIC CLAMP

William Owen, Pittsburgh, Pa., assignor to Pittsburgh Plate Glass Company, Allegheny County, Pa., a corporation of Pennsylvania Application October 27, 1938, Serial No. 237,295

4 Claims. (Cl. 294—88)

The present invention relates to apparatus for tempering glass and more particularly to means for supporting the glass sheets during such tempering operation.

The primary object of the invention is the provision of a clamping device which will positively support a glass sheet during the tempering operation and which will at the same time prevent undue penetration of the sheet surfaces by the points of the supporting means.

Other objects and advantages of the present invention will become more readily apparent from the following detailed description of a preferred embodiment thereof when taken in conjunction with the accompanying drawings.

Tempering or case-hardening of glass is accomplished by processes well known to the art. Ordinarily the glass is heated to approximately 1150 degrees F. in a suitable furnace and while at this temperature the glass is transported to a position between oscillating blowers, by means of which it is cooled rapidly. This tempering operation greatly increases the mechanical strength of the glass and creates therein properties which make it highly desirable for certain installations.

It will be readily apparent that in order to effect a uniform heating and cooling of the glass necessary for proper tempering, it is necessary that the glass sheets be supported in such manner that the least possible area of the surfaces thereof is covered by the supporting means. Because of the fact that at 1150° F. the glass is at or near its softening point, it is also necessary to support the glass sheets in such manner that they will not warp or sag. In general, the glass sheets are maintained in a vertical position through the use of tongs which grip the sheets near their upper edges.

Heretofore the operation of the tong supports has depended primarily upon the weight of the glass sheet being held thereby. The glass gripping elements at the ends of the jaws of the tongs have been so constructed that the downward pull of the glass sheet causes the jaws to close and to grip the glass more securely. This action entails considerable penetration of the surfaces of the glass sheet especially during the heating period when the glass is softened. Although in certain installations the indentations formed in one edge of the glass sheet may be covered by a frame or sash, in many other cases the indentations cannot be covered and are objectionable. Due to the physical characteristics of the tempered glass, it is not possible to cut the treated sheet and so remove the damaged section because any attempt at cutting the sheet results in a complete breakage thereof.

Briefly stated the present invention contemplates the use of magnetic elements to form the jaws of the supporting means whereby the magnetic flux emanating therebetween will result in a closing of the gripping elements and a positive support for the glass sheets may be had with minimum penetration of the glass.

Figure 3:
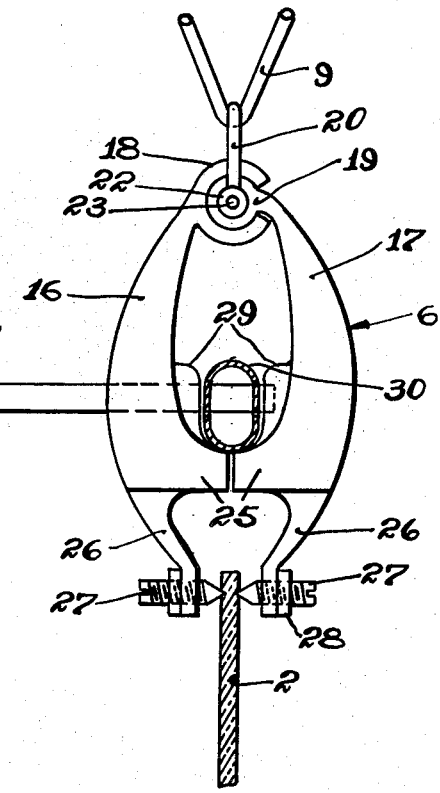

In the drawings wherein like numerals are employed to designate like parts throughout the same:

Figure 1 is a vertical sectional view of a glass tempering furnace illustrating the application of the magnetic clamps as contemplated by the invention; Figure 2 is a side elevational view of the magnetic clamps in operating position; Figure 3 is a front elevational view of one of the magnetic clamps in closed position; and Figure 4 is a front elevational view of one of the clamps in open position.

Referring to the drawings, a furnace 1 for heating glass sheets 2 has contained in its walls heating elements 3 of any capacity sufficient to maintain the temperature of the furnace at approximately 1200° F. The furnace is provided with an opening 4 extending the full length of the top portion thereof and closure flaps 5 are secured to the furnace walls at each side of the opening 4 as a seal therefor.

Each sheet of glass 2, which is supported along one edge by a plurality of clamps 6 secured in spaced relation along the horizontal bar 8 by straps 9, is carried through the furnace wherein the glass is to be heated. The horizontal bar 8 is carried by vertical rods 10 depending from a carriage yoke 11 to which are secured wheels 12 mounted for rotation along a horizontal I-beam 15, forming a mono-rail system. After the glass has reached the proper temperature one end of the furnace is opened to permit the glass sheet to be transported to a cooling apparatus (not shown).

Each of the clamps 6 comprises jaw portions 16 and 17 which are substantially of C-shape, one end of the member 16 is formed into a curved hook 18 in which is held by frictional engagement the enlarged eye 19 of the member 17. A pivotal link 20 substantially of V-shape is provided with enlarged sections 22 upon its ends through which a rod 23 extends, such rod also projects through the eye section 19 of the member 17 and serves to maintain the members 16 and 17 in proper pivotal relationship. The opposite, or lower, ends of the jaw portions 16 and 17 are provided with inwardly-projecting shoulders 25 from which complemental fingers 26 extend downwardly. Gripping elements 27 are threaded through the fingers 26 and lock nuts 28 permit adjustment of the gripping elements axially of each other and laterally of the fingers 26 in order that the amount of pressure exerted thereby upon the glass sheet 2 which is supported therebetween may be controlled. The members 16 and 17 also carry shoulders 29 formed slightly above the shoulders 25, and a cam shaft 30 is positioned therebetween. A rod 31, having one end portion removably mounted in openings 32 formed transversely in the shaft 30, is manually operable to rotate the latter for the purpose of forcing the shoulders 29 apart to open the clamp.

The members 16 and 17 are cast from a special alloy and subsequently magnetized. The engagement of the ends 18 and 19 of the members concentrates the magnetic flux in the shoulders 25. This magnetic attraction is sufficiently great to bring the gripping elements 27 together, in order that a positive support for a glass sheet will result. The depending fingers 26 and the gripping elements 27, as well as the cam shaft 30, are formed of non-magnetic material, such as stainless steel, in order that the magnetic flux will be concentrated in the shoulders 25. Operation of the cam shaft 30 provides sufficient leverage to overcome the magnetic attraction and therefore the clamp may be opened at will.

Ordinary magnetic materials cannot withstand the temperatures which are present in the furnace 1, and it therefore becomes necessary to use a special alloy comprising aluminum, nickel, copper, cobalt and iron. This alloy has been compounded and is supplied to the trade under the name "Alnico." It has been ascertained that this material has a melting point substantially over 2500° F. and that it will retain its magnetic properties at temperatures of approximately 1400° F. Accordingly, the magnetic clamps will continue to function while they pass through the furnace.

It is to be understood that the underlying principles of my invention which are responsible for the successful embodiment thereof need not be limited to application as supports for glass sheets during tempering operation. Obviously the magnetic clamps will function under other conditions and the supporting elements 27 may be so adjusted, to provide an effective grip at ordinary temperatures. The shape of the clamping member and its various applications may be subject to modification without departing from the spirit of my invention or the scope of the appended claims.

What I claim is:

1. A magnetic clamp comprising a pair of permanent magnets formed substantially of C-shape having pivotally connected end portions and free end portions lying in substantially the same plane, gripping elements of non-magnetic metal dependent from the free end portions of the magnets, the gripping elements being brought into operative relation by the magnetic attraction of the opposing free end portions of the magnets, and a cam of non-magnetic material operable within the clamp members for separating the free end portions thereof and therewith the gripping elements.

2. A magnetic clamp for supporting a glass plate during tempering comprising a pair of permanent magnets formed of an aluminum, nickel, copper, cobalt, iron alloy cast substantially in C-shape, the magnets having pivotally secured end portions and opposed free end portions lying substantially in the same plane, fingers dependent from the free end portions of the magnets, gripping elements of non-magnetic material horizontally disposed through the fingers, the gripping elements being brought into operative relation with the glass plate by the magnetic attraction of the opposing free end portions of the magnets, and a cam of non-magnetic material positioned upon the magnetic members, the cam being rotatable to separate the free end portions of the magnets and therewith the gripping elements to release the glass plate.

3. A magnetic clamp for supporting a glass plate during tempering comprising a pair of permanent magnets formed of an alloy containing approximately 54% of iron, 18% of nickel, 10% of aluminum, 6% of copper and 12% of cobalt cast substantially in C-shape, the magnets having pivotally secured end portions and opposed free end portions lying substantially in the same plane, fingers dependent from the free end portions of the magnets, gripping elements of non-magnetic material horizontally disposed through the fingers and adjustable in relation thereto, the gripping elements being brought into operative relation with the glass plate by the magnetic attraction of the opposing free end portions of the magnets, and a cam of non-magnetic material positioned upon the magnetic members, the cam being rotatable to separate the free end portions of the magnets and therewith the gripping elements to release the glass plate.

4. A magnetic clamp as defined in claim 1, characterized in that the permanent magnets retain their magnetic properties at temperatures exceeding 1200° F.

WILLIAM OWEN